US012324367B2

(12) United States Patent
Schroeder

(10) Patent No.: US 12,324,367 B2
(45) Date of Patent: Jun. 10, 2025

(54) SYSTEM AND METHOD FOR SELECTIVELY ACTIVATING SOIL SENSORS OF AN AGRICULTURAL IMPLEMENT

(71) Applicant: CNH Industrial America LLC, New Holland, PA (US)

(72) Inventor: Brittany Ann Schroeder, Bunker Hill, IN (US)

(*) Notice: Subject to any disclaimer, the term of this patent is extended or adjusted under 35 U.S.C. 154(b) by 262 days.

(21) Appl. No.: 18/078,224

(22) Filed: Dec. 9, 2022

(65) Prior Publication Data

US 2024/0188478 A1    Jun. 13, 2024

(51) Int. Cl.
*A01B 79/00* (2006.01)
*A01B 47/00* (2006.01)
*A01B 63/00* (2006.01)

(52) U.S. Cl.
CPC ............ *A01B 79/005* (2013.01); *A01B 47/00* (2013.01); *A01B 63/008* (2013.01)

(58) Field of Classification Search
CPC ..... A01B 47/00; A01B 63/008; A01B 63/111; A01B 63/1115; A01B 63/114; A01B 63/16; A01B 63/24–32; A01B 79/005; A01B 79/02
See application file for complete search history.

(56) References Cited

U.S. PATENT DOCUMENTS

| | | | | |
|---|---|---|---|---|
| 10,165,725 | B2 * | 1/2019 | Sugumaran | ........ G01C 21/3461 |
| 10,444,176 | B2 * | 10/2019 | Puhalla | ................... A01B 47/00 |
| 11,185,009 | B2 * | 11/2021 | Maxton | ................... A01B 49/06 |
| 11,191,206 | B2 * | 12/2021 | Eising | ..................... A01C 7/203 |
| 2002/0091458 | A1 * | 7/2002 | Moore | ................. A01D 41/127 |
| | | | | 700/109 |

(Continued)

FOREIGN PATENT DOCUMENTS

| CN | 210808130 U | 6/2020 |
|---|---|---|
| CN | 210928523 U | 7/2020 |

(Continued)

OTHER PUBLICATIONS

JP-2019103431-A machine translation (Year: 2019).*

(Continued)

*Primary Examiner* — Angelina M Shudy
*Assistant Examiner* — Mark Robert Heim
(74) *Attorney, Agent, or Firm* — Rebecca Henkel; Peter K. Zacharias; Rickard K. DeMille

(57) ABSTRACT

An implement monitoring/soil sensor control system for an agricultural implement may include one or more soil sensors configured to couple to a ground engaging tool of the agricultural implement. The one or more soil sensors may be configured to detect one or more soil properties. Additionally, the soil sensor control system includes a controller with a memory and a processor. The controller is configured to receive a signal indicative of a height of a main frame of the agricultural implement above a soil surface, determine a tool penetration depth of the ground engaging tool based on the height of the main frame, wherein the ground engaging tool is configured to couple to the main frame, and selectively activate the one or more soil sensors based on the tool penetration depth of the ground engaging tool.

20 Claims, 4 Drawing Sheets

(56) References Cited

U.S. PATENT DOCUMENTS

| | | | | |
|---|---|---|---|---|
| 2013/0180742 A1* | 7/2013 | Wendte | ............ | A01B 63/1145 172/4 |
| 2014/0116735 A1* | 5/2014 | Bassett | ............ | A01C 7/203 172/430 |
| 2014/0163856 A1* | 6/2014 | Chen | ............ | A01B 79/005 701/300 |
| 2016/0195505 A1* | 7/2016 | Pickett | ............ | A01B 79/005 702/2 |
| 2017/0172058 A1* | 6/2017 | Lund | ............ | A01C 5/064 |
| 2018/0077850 A1* | 3/2018 | Henry | ............ | A01B 79/005 |
| 2018/0153088 A1* | 6/2018 | Sporrer | ............ | A01B 49/065 |
| 2018/0206393 A1* | 7/2018 | Stoller | ............ | A01B 63/24 |
| 2018/0239044 A1* | 8/2018 | Rhodes | ............ | G01N 33/246 |
| 2020/0000005 A1* | 1/2020 | Stanhope | ............ | A01B 35/26 |
| 2020/0008337 A1* | 1/2020 | Zemenchik | ............ | A01B 63/008 |
| 2020/0045875 A1* | 2/2020 | Eising | ............ | G01B 11/22 |
| 2020/0060062 A1* | 2/2020 | Sporrer | ............ | A01B 63/22 |
| 2020/0084953 A1* | 3/2020 | Stanhope | ............ | A01B 63/32 |
| 2020/0084954 A1* | 3/2020 | Sporrer | ............ | A01B 49/027 |
| 2020/0100419 A1* | 4/2020 | Stanhope | ............ | A01B 19/10 |
| 2020/0113126 A1* | 4/2020 | Eising | ............ | A01C 21/007 |
| 2020/0225206 A1 | 7/2020 | Strnad et al. | | |
| 2020/0236835 A1* | 7/2020 | Stanhope | ............ | A01B 79/005 |
| 2020/0236836 A1* | 7/2020 | Barrick | ............ | A01B 79/005 |
| 2020/0396889 A1 | 12/2020 | Kowalchuk | | |
| 2020/0404831 A1* | 12/2020 | Kowalchuk | ............ | A01C 21/00 |
| 2021/0100154 A1* | 4/2021 | Henry | ............ | A01B 21/086 |
| 2021/0185884 A1* | 6/2021 | Rylander | ............ | A01B 63/114 |
| 2021/0215595 A1* | 7/2021 | Henry | ............ | G01N 21/31 |
| 2021/0235609 A1* | 8/2021 | Ferrari | ............ | G01S 13/885 |
| 2021/0259149 A1* | 8/2021 | Zemenchik | ............ | A01B 79/005 |
| 2021/0298217 A1* | 9/2021 | Kovach | ............ | A01B 63/32 |
| 2021/0298221 A1* | 9/2021 | Kovach | ............ | A01B 59/002 |
| 2022/0000007 A1* | 1/2022 | Strnad | ............ | A01B 79/02 |
| 2022/0091089 A1* | 3/2022 | Corpstein | ............ | G01N 27/04 |
| 2022/0373317 A1* | 11/2022 | Swanson | ............ | G01B 17/00 |
| 2022/0386519 A1* | 12/2022 | Leininger | ............ | A01B 63/24 |
| 2023/0059032 A1* | 2/2023 | Hodel | ............ | A01C 7/203 |
| 2023/0354747 A1* | 11/2023 | Chavasse | ............ | A01D 46/30 |

FOREIGN PATENT DOCUMENTS

| | | | | |
|---|---|---|---|---|
| CN | 112014433 B | | 6/2021 | |
| CN | 112425293 B | | 12/2021 | |
| JP | 2019103431 A | * | 6/2019 | |
| WO | WO-2019079205 A1 | * | 4/2019 | ............ A01B 47/00 |
| WO | 2021094842 A1 | | 5/2021 | |
| WO | 2021144629 A | | 7/2021 | |
| WO | WO-2022093101 A1 | * | 5/2022 | ............ A01B 19/10 |

OTHER PUBLICATIONS

Vogt, Willie, "Super Sensors for Planting, Tillage", Farm Progress, Mar. 14, 2019, https://www.farmprogress.com/equipment/super-sensors-planting-tillage.

"Using Conservation Tillage in Organic Systems" Wheat & Small Grains, https://smallgrains.wsu.edu/using-conservation-tillage-in-organic-systems/, last visited Dec. 8, 2022.

* cited by examiner

SYSTEM AND METHOD FOR SELECTIVELY ACTIVATING SOIL SENSORS OF AN AGRICULTURAL IMPLEMENT

BACKGROUND OF THE INVENTION

The present disclosure relates generally to a system and method for selectively activating soil sensors of an agricultural implement.

Certain agricultural implements include ground engaging tools configured to interact with soil. For example, a tillage implement may include tillage points and/or disc blades configured to break up the soil of a field for subsequent planting or seeding operations. Certain tillage implements include a depth adjustment mechanism configured to control a penetration depth of the ground engaging tool or tools into the soil. For example, an agricultural implement may include a turnbuckle extending between a hitch assembly and a frame of the tillage implement. The turnbuckle may be adjusted to set the height of the frame relative to the surface of the soil, thereby setting the penetration depth of the ground engaging tools to a target penetration depth. In addition, ground engaging tool(s) of an agricultural implement (e.g., the tillage implement) may be independently adjusted to set a penetration depth relative to the soil surface. In any case, the agricultural implement may additionally include sensor(s) coupled to the ground engaging tool(s) and configured to detect property/properties of the soil (e.g., temperature, percentage organic soil, soil pH, soil moisture, soil composition).

SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a soil sensor control system for an agricultural implement includes a controller with a memory and a processor. The controller may be configured to determine a tool penetration depth of a ground engaging tool configured to couple to a main frame of the agricultural implement, and determine a condition of each soil sensor of one or more soil sensors coupled to the ground engaging tool based on the tool penetration depth of the ground engaging tool. The condition of each soil sensor may include one of above a soil surface, below a soil surface, or at a soil surface. Furthermore, the controller may be configured to control an operational state of each soil sensor of the one or more soil sensors based on the condition of the soil sensor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
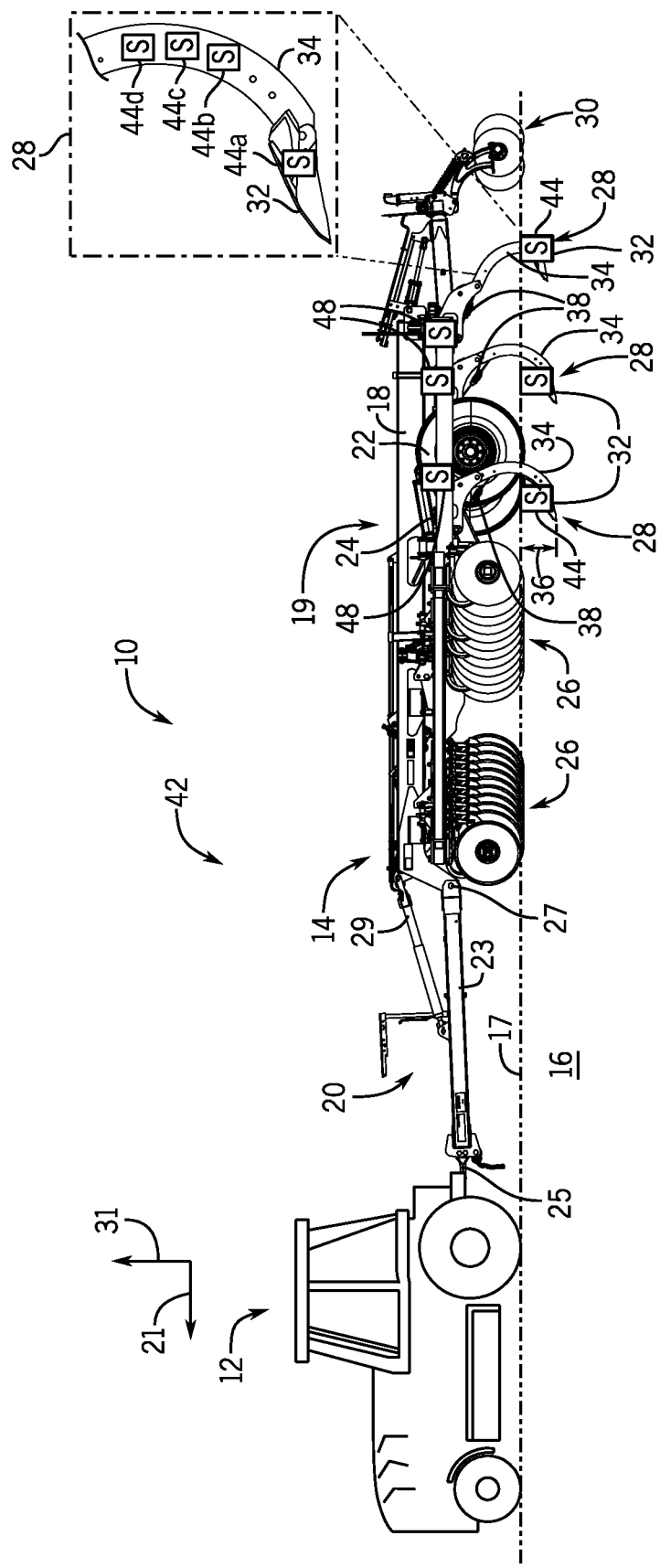
FIG. 1 is a side view of an embodiment of an agricultural system having a work vehicle, an agricultural implement, and an implement monitoring/soil sensor control system including one or more soil sensors.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Tillage implements may include at least one ground engaging tool (e.g., tillage point(s), disc harrow(s), cultivator shank(s), cultivator sweep(s)) configured to break up soil and/or churn the soil prior to planting or seeding. For example, certain tillage implements have one or more ground engaging tools, such as tillage point assemblies, extending from a main frame of the tillage implement. Each tillage point assembly may be pivotally coupled to the main frame and positioned behind, with respect to a direction of travel of a work vehicle, one or more disc blade assemblies that may be coupled to the main frame. Further, the disc blade assemblies may be used to till (e.g., plough, cultivate, turn over) the soil as the work vehicle pulls the tillage implement across the field (e.g., the soil surface).

In addition, the tillage point assemblies may be used to further till the soil by churning, breaking up, and mixing the soil. The tillage point assemblies may each include a tillage point and a shank (e.g., shaft). Furthermore, multiple tillage point assemblies may be distributed along a width of the main frame. During operation, at least one of the tillage point assemblies may be rotated/oriented to place the tillage point assembly in a working position, which may enable the tillage point assembly to engage the soil of the field at a tool penetration depth. In some embodiments, when the tillage point assemblies are engaging the soil, the soil may apply a force (e.g., a longitudinal force opposite that of the direction of travel of the work vehicle) to the tillage point assembly/assemblies and at least one of the tillage point assemblies may rotate to a deflected position due to. In this instance, the deflected position may cause a decreased tool penetration depth of the tillage point assembly as compared to a tool penetration depth of the tillage point assembly in a non-deflected position. Therefore, during operation, the tool penetration depth of the tillage point assembly/assemblies may change (e.g., vary, decrease, increase) as the working vehicle and/or agricultural implement moves through the field.

To provide a desired tool penetration depth, a down pressure is applied to each tillage point assembly to urge the tillage point assembly toward the working position. In certain embodiments, the tillage implement includes an implement monitoring/soil sensor control system having one or more actuators (e.g., hydraulic actuator(s), etc.) and/or one or more sensors that are each communicatively coupled to a controller of the implement monitoring/soil sensor control system. At least one actuator may be coupled to each tillage point assembly, and the controller may control down pressure, via the actuator(s), of each tillage point assembly (e.g., based on feedback received from the one or more sensors). For example, the one or more sensors may include pressure sensor(s) that detect pressure(s) of hydraulic fluid inside respective hydraulic actuator(s). Each pressure sensor may output a respective sensor signal indicative of the detected hydraulic fluid pressure to the controller, and the controller may determine the down pressure of the tillage point(s) based on the detected hydraulic fluid pressure. In response to the determined down pressure being greater than or less than a target pressure/target pressure range, the controller may control each respective hydraulic actuator to increase or decrease the down pressure to substantially equal the target pressure/be within the target pressure range. In this way, the controller may provide substantially consistent down pressure of the tillage point assemblies while in operation.

In some embodiments, the desired tool penetration depth may be provided in part by a biasing element, such as spring(s), which may extend between the main frame (e.g., a mounting bracket of the frame) and a shank of each tillage point assembly/assemblies. The spring(s) are configured to urge the tillage point assembly/assemblies toward the target depth. As discussed herein, as the agricultural implement moves through the field, the soil may apply a force to the tillage point assembly/assemblies greater than the force applied by the spring(s) (e.g., due to contact with an obstruction, an increase in soil density and/or hardness, an increase in speed of the agricultural implement, etc.). As a result, the tillage point assembly/assemblies may deviate from the target depth. For example, if the tillage point assembly/assemblies contact an obstruction, the tillage point assembly/assemblies may temporarily rotate to a deflected position. The spring(s) may then drive the tillage point assembly/assemblies from the deflected position to the target depth after the tillage point assembly/assemblies passes the obstruction. While the spring(s) may be coupled to the tillage point assembly/assemblies, in other embodiments, another suitable biasing element (e.g., a pneumatic cylinder, a hydraulic cylinder, a resilient material, etc.) may be coupled to at least one tillage point assembly. Moreover, at least one biasing element may be controllably adjusted to control the force applied to the tillage point assembly/assemblies to enable the tillage point(s) of the tillage point assembly/assemblies to reach the target depth below the surface of the soil.

Furthermore, to monitor soil conditions and gather soil condition information that may be useful during planting and/or seeding operations, the implement monitoring/soil sensor control system of the tillage implement may additionally include sensor(s) coupled to the ground engaging tool(s) and configured to detect property/properties of the soil (e.g., temperature, percentage organic soil, soil pH, soil moisture, soil composition). For example, multiple sensors may be arranged vertically along at least one ground engaging tool, such as the tillage point(s) and/or shank(s). In this way, during operation (e.g., while the ground engaging tool(s) are in the working position), the sensors may detect and output data associated with the property/properties of the soil at associated depths of the soil. The controller of the implement monitoring/soil sensor control system may collect the data associated with the property/properties of the soil and may store the data to be used for subsequent planting and/or seeding operations. For example, the detected property/properties of the soil may be used to determine a seeding depth and/or time for planting, which results in a more even emergence of the plants and/or crops within the field (e.g., each plant emerges from the soil at relatively the same time), thereby resulting in a higher crop yield as compared to fields seeded and/or planted without use of the data associated with the detected soil property/properties.

However, during operation, the height of the frame and/or the penetration depth of the ground engaging tool(s) relative to the surface of the soil may be adjusted and, therefore, may cause one or more of the sensor(s) to be exposed to the air. The sensor(s) that are exposed to the air may output data associated with property/properties of the air above the soil surface (e.g., the field). Furthermore, incorporating the data associated with the property/properties of the air may cause the data associated with the property/properties of the soil to be erroneous and/or inaccurate, and may additionally impact subsequent planting and/or seeding operations. Thus, the implement monitoring/soil sensor control system, as discussed herein, provides for adjustable activation of one or more soil monitoring sensors based on a penetration depth of a respective ground engaging tool (e.g., tillage point assembly). Additionally or alternatively, the implement monitoring/soil sensor control system may enable selective inclusion of the respective output data associated with the detected property/properties of the soil at the associated soil depth(s) based on the penetration depth of the respective ground engaging tool (e.g., tillage point assembly). Therefore, data collected and/or stored from soil monitoring sensor(s) may more accurately reflect actual soil property/properties and may enable improved subsequent planting and/or seeding operations.

Turning to the drawings, FIG. 1 is a side view of an embodiment of an agricultural system 10 having a work vehicle 12, an agricultural implement 14, and an implement monitoring/soil sensor control system 42 including one or more soil sensors 44. In the illustrated embodiment, the agricultural implement 14 is a primary tillage implement having multiple ground engaging tool assemblies configured to till soil 16. As illustrated, the agricultural implement 14 includes a main frame 18 and a hitch assembly 20 coupled to the main frame 18. The hitch assembly 20 is configured to couple to the work vehicle 12 (e.g., tractor or other prime mover), and the work vehicle 12 is configured to tow the agricultural implement 14 through a field along a direction of travel 21. In the illustrated embodiment, the agricultural implement 14 includes wheels 22 configured to engage a surface 17 of the soil 16 and to support at least a portion of the weight of the agricultural implement 14. In addition, the agricultural implement 14 includes wheel actuator(s) 24 (e.g., hydraulic cylinder, linear actuator, etc.) configured to move the wheels 22 from the illustrated raised position to a lowered position. While the wheels 22 are in the illustrated raised position, ground engaging tool assemblies of the agricultural implement 14 engage the soil 16. As the agricultural implement 14 is towed through the field, the ground engaging tool assemblies condition the soil 16 and/or residue disposed on the surface 17 of the soil 16 for subsequent planting or seeding operations. The wheel actuator(s) 24 may raise the wheels 22 from the illustrated lowered position to the raised position. As a result, the ground engaging tool assemblies are disengaged from the soil 16 to facilitate transport of the agricultural implement 14 (e.g., between successive rows of the field). In some embodiments, the wheel actuator(s) 24 may raise and/or lower the wheels 22 to increase and/or decrease, respectively, a down pressure and/or a tool penetration depth of the ground engaging tool assemblies. The tool penetration depth may correspond to a portion of a vertical length (e.g., a height, an amount), with respect to a vertical axis 31, of the ground engaging tool that is beneath the surface 17 of the soil 16 (e.g., submerged below the surface 17 of the soil 16, extended into the soil 16).

In certain embodiments, each wheel is part of a respective wheel assembly 19 that includes a wheel frame. The wheel frame may be pivotally coupled to the main frame 18, thereby facilitating adjustment of the vertical position of each wheel 22. In other embodiments, the wheel frame may be movably coupled to the main frame 18 by another suitable connection (e.g., sliding connection, linkage assembly, etc.) that facilitates adjustment of the vertical position of the respective wheel. In certain embodiments, the agricultural implement includes two wheel assemblies, and each wheel assembly includes a single respective wheel. However, in other embodiments, the agricultural implement may include more or fewer wheel assemblies (e.g., 1, 2, 3, 4, 5, 6, or more). In addition, each wheel assembly may include any suitable number of wheels (e.g., 1, 2, 3, 4, 5, 6, or more).

In certain embodiments, the agricultural implement 14 may include multiple wheel actuators 24 with each wheel actuator 24 coupled to the main frame 18 and to the wheel frame of a respective wheel assembly. Each wheel actuator 24 is configured to control a vertical position of the wheel assembly relative to the main frame 18 (e.g., relative to the vertical axis 31). For example, each wheel actuator 24 may control a vertical position of a respective wheel 22 relative to the main frame 18. In certain embodiments, a single wheel actuator may be coupled to each respective wheel assembly. However, in other embodiments, a single wheel actuator may be coupled to multiple wheel assemblies, and/or multiple wheel actuators may be coupled to at least one wheel assembly.

In the illustrated embodiment, the hitch assembly 20 includes a hitch frame 23 and a hitch 25. The hitch frame 23 is pivotally coupled to the main frame 18 via pivot joint(s) 27, and the hitch 25 is configured to couple to a corresponding hitch of the work vehicle 12. While the hitch frame 23 is pivotally coupled to the main frame 18 in the illustrated embodiment, in other embodiments, the hitch frame 23 may be movably coupled to the main frame 18 by a linkage assembly (e.g., four bar linkage assembly, etc.) or another suitable assembly/mechanism that enables the hitch 25 to move vertically relative to the main frame 18.

Furthermore, in some embodiments, the agricultural implement 14 may include a hitch actuator 29 coupled to the main frame 18 and to the hitch frame 23 of the hitch assembly 20. The hitch actuator 29 may be configured to control a vertical position of the hitch 25 of the hitch assembly 20 relative to the main frame 18 (e.g., relative to the vertical axis 31). While the agricultural implement 14 includes a single hitch actuator 29 in the illustrated embodiment, in other embodiments, the agricultural implement 14 may include more hitch actuators 29 extending between the implement frame 18 and the hitch frame 23. Furthermore, while the hitch actuator 29 is coupled to the hitch frame 23 in the illustrated embodiment, in other embodiments, the hitch actuator 29 may be coupled directly to the hitch 25 or another suitable element of the hitch assembly 20.

In the illustrated embodiment, the agricultural implement 14 includes ground engaging tool(s), such as disc blade(s) 26, tillage point assembly/assemblies 28, and finishing disc(s) 30. The disc blade(s) 26 are configured to engage a top layer of the soil 16. As the agricultural implement 14 is towed through the field, the disc blade(s) 26 are driven to rotate, thereby breaking up the top layer and sizing residue on the surface 17 of the field. In the illustrated embodiment, the disc blade(s) 26 are arranged in two rows. However, in alternative embodiments, the disc blade(s) 26 may be arranged in more or fewer rows (e.g., 1, 2, 3, 4, 5, 6, or more). In addition, the angle of each row may be selected and/or controlled to control the interaction of the disc blade(s) 26 with the top layer of soil 16. For example, the disc blade(s) 26 may be arranged in one or more gangs, and an actuator (e.g., hydraulic cylinder, linear actuator, etc.) may adjust the angle of each gang relative to the direction of travel 21 of the agricultural implement 14. The tillage point assembly/assemblies 28 are configured to engage the soil 16 at a greater depth than the disc blade(s) 26, thereby breaking up a lower layer of the soil 16. In the illustrated embodiment, each tillage point assembly 28 includes a tillage point 32 and a shank 34 (e.g., shaft 34). The shank 34 is configured to position the tillage point 32 at a target depth 36 beneath the soil surface 17, and the tillage point 32 is configured to break up the soil 16. The shape of each tillage point, the arrangement of the tillage point assemblies, and the number of tillage point assemblies may be selected to control tillage within the field. Furthermore, as the agricultural implement 14 is towed through the field, the finishing disc(s) 30 are driven to rotate, thereby sizing soil clods, leveling the soil surface, smoothing the soil surface, destroying weeds, cutting residue on the soil surface, or a combination thereof.

Additionally, in the illustrated embodiment, a biasing element, such as the illustrated spring(s) 38, extends between the main frame 18 (e.g., a mounting bracket of the frame) and the shank 34 of each tillage point assembly/assemblies 28. The spring(s) 38 are configured to urge the tillage point assembly/assemblies 28 toward the target depth. As the agricultural implement moves through the field, the soil 16 may apply a force to the tillage point assembly/assemblies 28 greater than the force applied by the spring(s) 38 (e.g., due to contact with an obstruction, an increase in soil density and/or hardness, an increase in speed of the agricultural implement, etc.). As a result, the tillage point assembly/assemblies 28 may deviate from the target depth. For example, if the tillage point assembly/assemblies 28 contact an obstruction, the tillage point assembly/assemblies 28 may temporarily rotate to a deflected position. The spring(s) 38 may then drive the tillage point assembly/assemblies 28 from the deflected position to the target depth after the tillage point assembly/assemblies 28 passes the obstruction. While the spring(s) 38 are coupled to the tillage point assembly/assemblies 28 in the illustrated embodiment, in other embodiments, another suitable biasing element (e.g., a pneumatic cylinder, a hydraulic cylinder, a resilient material, etc.) may be coupled to at least one tillage point assembly. Moreover, at least one biasing element may be controllably adjusted to control the force applied to the tillage point assembly/assemblies 28 to enable the tillage point(s) 32 of the tillage point assembly/assemblies 28 to reach the target depth below the surface 17 of the soil 16.

Furthermore, in the illustrated embodiment, the agricultural implement 14 includes or is coupled to an implement monitoring/soil sensor control system 42 (e.g., control system, monitoring system) configured to monitor, adjust, and/or determine the position of the main frame 18, the tillage point assembly/assemblies 28, and/or other ground engaging tool(s). The implement monitoring/soil sensor control system 42 includes soil sensor(s) 44 coupled to the ground engaging tool(s) (e.g., tillage point assembly/assemblies 28). Additionally, a controller of the implement monitoring/soil sensor control system 42 is communicatively coupled to and configured to control activation of one or more of the soil sensor(s) 44. The implement monitoring/soil sensor control system 42 may be coupled to any suitable portion of the agricultural implement 14 (e.g., the main frame), to the work vehicle 12 towing the agricultural implement 14, to another suitable structure, or a combination thereof (e.g., the controller of the implement monitoring/soil sensor control system 42 may be distributed among multiple controller sections). Furthermore, in some embodiments, the implement monitoring/soil sensor control system 42 may include soil sensor(s) 44 coupled to one or more non-tool elements of the agricultural implement 14. For example, the soil sensor(s) may be coupled to one or more independent ground engaging elements coupled to the agricultural implement frame 18.

As discussed in detail below, the controller of the implement monitoring/soil sensor control system 42 is configured to control an operational state (e.g., activate, deactivate) of the soil sensors 44. For example, the controller of the implement monitoring/soil sensor control system 42 may be configured to determine a condition (e.g., above the surface 17 of the soil 16, at the surface 17 of the soil 16, or below the surface 17 of the soil 16) of each sensor 44 and control the operational state of the soil sensor 44 based on the condition of the soil sensor 44. For example, in certain embodiments, the controller may receive an indication of a height of the main frame 18 above the surface 17 of the soil 16. Further, the controller may determine the tool penetration depth of a ground engaging tool (e.g., a tillage point assembly 28) coupled to the main frame 18 based on the height of the main frame 18. The controller may then determine the condition of each soil sensor 44 coupled to the ground engaging tool based on the tool penetration depth of the ground engaging tool. Furthermore, the controller may control the operational state of each soil sensor based on the respective condition. In some embodiments, the controller may receive an indication of the tool penetration depth of the ground engaging tool, and the controller may control the operational state of the soil sensor(s) 44 based on the tool penetration depth. For example, in certain embodiments, the controller may receive the indication of the tool penetration depth(s) of the ground engaging tool(s) (e.g., tillage point assembly/assemblies 28). The controller may control the operational state (e.g., activate, deactivate) each soil sensor 44 coupled to the ground engaging tool(s) based on the tool penetration depth(s). Additionally or alternatively, the controller may be configured to determine the condition (e.g., above the surface 17 of the soil 16, at the surface 17 of the soil 16, or below the surface 17 of the soil 16) of each sensor 44 based on the tool penetration depth of the ground engaging tool and control the operational state of the soil sensor 44 based on the condition of the soil sensor 44.

Additionally or alternatively, in some embodiments, the operational state of each of the soil sensor(s) 44 may cause the controller 50 to selectively receive and/or regard (e.g., in the activated operational state) and/or disregarding (e.g., in the deactivated operational state) input and/or data from the soil sensor(s) 44 regarding detected one or more properties of the soil. For example, the controller 50 may selectively receive (e.g., process) or ignore (e.g., block, not receive, not process) data from each soil sensor 44 based on the operational state of the soil sensor 44, tool penetration depth, the condition of the soil sensor 44, or a combination thereof.

For example, the soil sensors 44 may be arranged along the vertical length, with respect to the vertical axis 31, of the ground engaging tool such that each of the soil sensors 44 may correspond to a position value (e.g., height, 75 cm, 25 cm, 35 cm) along the ground engaging tool. For example, the soil sensors 44 may be arranged in a vertical array (e.g., vertical column, vertical configuration) along the ground engaging tool (e.g., tillage point assembly 28, shank 34, tillage point 32), with respect to the vertical axis 31, such that during operation (e.g., the ground engaging tools are engaged with the soil 16), each of the position values of the soil sensors 44 may correspond to a soil depth. Moreover, the controller may determine the respective soil depth of the soil sensors 44 based on the determined tool penetration depth. Furthermore, the controller may determine the condition of each soil sensor 44 based on the position value of the soil sensor 44 along the ground engaging tool and the tool penetration depth of the ground engaging tool. In response to determining the condition of the soil sensor(s) 44, the controller may control the operational state of each soil sensor 44. For example, in some embodiments, a first, a second, a third, and a fourth soil sensor 44a, 44b, 44c, 44d may have position values of 15 cm, 25 cm, 50 cm, and 75 cm, respectively, along the vertical extent of the ground engaging tool. Furthermore, the controller may receive an indication of the height of the main frame 18 above the surface 17 of the soil 16 and determine (e.g., calculate) that the tool penetration depth of the ground engaging tool is 50 cm. The controller may then determine the vertical position of each soil sensor 44 relative to the soil surface (e.g., soil sensor placement depth) based on the position value and the penetration depth of the ground engaging tool. In this example, the controller may compare the position values of 15 cm, 25 cm, 50 cm, and 75 cm of each of the first, the second, the third, and the fourth soil sensor 44a, 44b, 44c, 44d to the tool penetration depth of 50 cm to determine whether the respective position values of each soil sensor is greater than, equal to, or less than the tool penetration depth. For instance, the controller may determine that the position value of the first sensor 44a, 15 cm, is less than the tool penetration depth, 50 cm, and/or may subtract the tool penetration depth, 50 cm, from the position value of the first soil sensor 44a, 15 cm, to calculate the vertical position of the first soil sensor 44a relative to the soil surface as equal to −35 cm. In this instance, a negative vertical position may indicate that the soil sensor 44 is below the surface 17 of the soil 16, whereas a positive vertical position may indicate that the soil sensor 44 is above the surface 17 of the soil 16 and a vertical position of zero may indicate that the soil sensor 44 is at and/or equal to the surface 17 of the soil 16. In some embodiments, the controller may utilize a lookup table to determine the vertical position of the soil sensor(s). Continuing with the above example, the controller may determine the conditions of the first, second, and third soil sensor 44a, 44b, 44c are at or below the surface 17 of the soil 16, and the condition of the fourth soil sensor 44d is above the surface 17 of the soil 16 based on the vertical position(s) of the soil sensor(s). In response to determining the condition of the first, second, third, and fourth soil sensors 44a, 44b, 44c, 44d, the controller may activate the first, second, and third soil sensor 44a, 44b, 44c, and abstain from activating or deactivate the fourth soil sensor 44d. In some embodiments, the controller may include control logic and in response to determining the tool penetration depth, may control the operational state of each soil sensor 44. In particular, the controller may determine the detected tool penetration depth and activate the soil sensor(s) 44 that correspond to one or more threshold value(s). For example, one or more of the soil sensor(s) 44 may be associated with one or more of the threshold value(s) and the controller may determine that when the detected tool penetration depth is greater than or equal to a threshold value of the one or more threshold value(s), the controller may activate the soil sensor(s) that are associated with the threshold value. While when the detected tool penetration depth is less than the threshold value, the controller may abstain from activating the soil sensor(s) 44 that correspond to the threshold value.

In some embodiments, the controller 50 may utilize a lookup table to determine the operational state of the soil sensor(s) 44. In particular, the lookup table may include one or more threshold value(s) and/or one or more threshold range(s) (e.g., 25 cm, 75 cm, 0-20 cm, 0-30 cm, 0-40 cm, and so forth) and the soil sensor(s) 44 that may be associated with the threshold value(s) and/or threshold range(s). For example, the controller may determine the tool penetration depth of the ground engaging tool(s) and compare the tool penetration depth to the threshold value(s) and/or threshold range(s) stored in the lookup table. In response to the tool penetration depth being greater than or equal to the threshold value(s) and/or threshold range(s), the controller may activate the soil sensor(s) 44 that are associated with (e.g., indicated by the lookup table) the threshold value(s) and/or threshold range(s). On the other hand, in response to the tool penetration depth being less than the threshold value(s) and/or threshold range(s), the controller may abstain from activating the soil sensor(s) 44 that are associated with the threshold value(s) and/or threshold range(s). In some embodiments, the lookup table may comprise one or more tool penetration depth(s) and/or tool penetration depth range(s) and the associated soil sensor(s). The controller may utilize the lookup table to determine activation of the soil sensor(s) based on the tool penetration depth(s) and/or tool penetration depth range(s). For example, the controller may determine and/or detect the tool penetration depth of the ground engaging tool and utilize the lookup table to activate the one or more soil sensor(s) coupled to the ground engaging tool that are associated with the tool penetration depth and/or associated with a tool penetration depth range corresponding to the determined and/or detected tool penetration depth (e.g., the determined and/or detected tool penetration depth may be a maximum tool penetration depth value of the corresponding tool penetration depth range).

In the illustrated embodiment, the implement monitoring/soil sensor control system 42 also includes main frame sensor(s) 48 coupled to the main frame 18. Each main frame sensor 48 is configured to emit an output signal toward the surface 17 of the soil 16 and to receive a return signal indicative of a height of the main frame 18 above the surface 17 of the soil 16. The main frame sensor(s) 48 are communicatively coupled to the controller of the implement monitoring/soil sensor control system 42, and the controller may be configured to receive the signal indicative of the height of the main frame 18 and in response to receiving the signal, determine the tool penetration depth of the ground engaging tool(s) based on the height of the main frame 18. Each main frame sensor 48 may be any suitable type of sensor configured to emit the output signal and to receive the return signal indicative of the height of the main frame 18 above the surface 17 of the soil 16. In certain embodiments, at least one main frame sensor 48 may include an infrared sensor configured to emit an infrared signal toward the surface 17 of the soil 16 and to receive a return infrared signal from the surface 17 of the soil 16. Furthermore, in certain embodiments, at least one main frame sensor 48 may include a radio detection and ranging (RADAR) sensor (e.g., millimeter wave (MMW) scanner, etc.) configured to emit a radio frequency signal toward the surface 17 of the soil 16 and to receive a return infrared signal from the surface 17 of the soil 16. In addition, in certain embodiments, at least one main frame sensor 48 may include a Light Detection and Ranging (LIDAR) sensor (e.g., time-of-flight scanning laser, etc.) configured to emit a light signal toward the surface 17 of the soil 16 and to receive a return light signal from the surface 17 of the soil 16. By way of further example, in certain embodiments, at least one main frame sensor 48 may include an ultrasonic sensor configured to emit an ultrasonic signal toward the surface 17 of the soil 16 and to receive a return ultrasonic signal from the surface 17 of the soil 16. Furthermore, in certain embodiments, at least one main frame sensor 48 may include a capacitive sensor configured to emit an electric signal/field toward the surface 17 of the soil 16 and to receive a return electric signal from the surface 17 of the soil 16 (e.g., in the form of a change to the emitted electric signal/field).

Furthermore, while each main frame sensor 48 may be mounted to the main frame 18 and directed toward the surface 17 of the soil 16 in the illustrated embodiment, in other embodiments, at least one main frame sensor 48 may be mounted to a ground engaging tool (e.g., the shank 34 of the tillage point assembly 28) and directed toward the surface 17 of the soil 16. In such embodiments, the at least one main frame sensor 48 may emit an output signal toward the surface 17 of the soil 16 and receive a return signal indicative of a position of the respective ground engaging tool (e.g., the respective tillage point assembly) relative to the surface 17 of the soil 16.

Furthermore, in certain embodiments, at least one main frame sensor 48 may include another suitable type of sensor (e.g., alone or in combination with one or more of the sensors described above), such as a potentiometer, one or more contact switches, a camera, a Hall effect sensor, a linear variable differential transformer (LVDT), or a combination thereof. In addition, at least one main frame sensor 48 may include a pressure sensor configured to monitor hydraulic or pneumatic pressure of a cylinder (e.g., the wheel actuator(s)) configured to move the wheels 22 from the illustrated raised position to a lowered position, thereby adjusting the height of the main frame 18 relative to the surface 17 of the soil 16. Therefore, the controller may be configured to determine the height of the main frame 18 and/or the tool penetration depth of the ground engaging tool(s) based on the pressure within the cylinder (e.g., the position of the wheels 22). While the implement monitoring/soil sensor control system 42 illustrated in FIG. 1 includes three main frame sensors 48 in the illustrated embodiment, in other embodiments, the implement monitoring/soil sensor control system 42 may include more or fewer sensors (e.g., 0, 1, 2, 4, 5, 6, 7, 8, 9, 10, or more). For example, the implement monitoring/soil sensor control system 42 may include one main frame sensor 48 for each tillage point assembly 28.

While the implement monitoring/soil sensor control system 42 includes sensor(s) configured to monitor the height of the main frame and/or the tool penetration depth of one or more ground engaging tools (e.g., such as the tillage point assembly/assemblies 28) in the illustrated embodiment, in other embodiments, the implement monitoring/soil sensor control system may include sensor(s) configured to monitor the position(s) and/or tool penetration depth(s) of other suitable type(s) of ground engaging tool assemblies. For example, in certain embodiments, the agricultural implement 14 may include a disc blade assembly having a shank rotatably coupled to the implement frame and a disc blade rotatably coupled to the shank. In such embodiments, a respective sensor may monitor the position of the disc blade assembly, and the controller may determine the tool penetration depth of the disc blade assembly based on the position. Accordingly, while the implement monitoring/soil sensor control system 42 described herein is used to detect (e.g., monitor) and/or determine the height of the main frame and/or the tool penetration depth of the ground engaging tool(s), in other embodiments, the implement monitoring/soil sensor control system 42 may detect and/or determine the tool penetration depth of one or more other suitable ground engaging tool assemblies (e.g., of a tillage implement or another suitable type of implement, such as a planting implement, a seeding implement, or a harvesting implement).

While the illustrated agricultural implement 14 includes the disc blades 26, the tillage point assemblies 28, and the finishing discs 30, in other embodiments, the agricultural implement 14 may include other and/or additional ground engaging tool assemblies (e.g., leveling discs configured to size clods and/or smooth the field surface, etc.). Furthermore, while the agricultural implement 14 is towed by a work vehicle 12 in the illustrated embodiment, in other embodiments, the agricultural implement 14 may be self-propelled.

Figure 2:
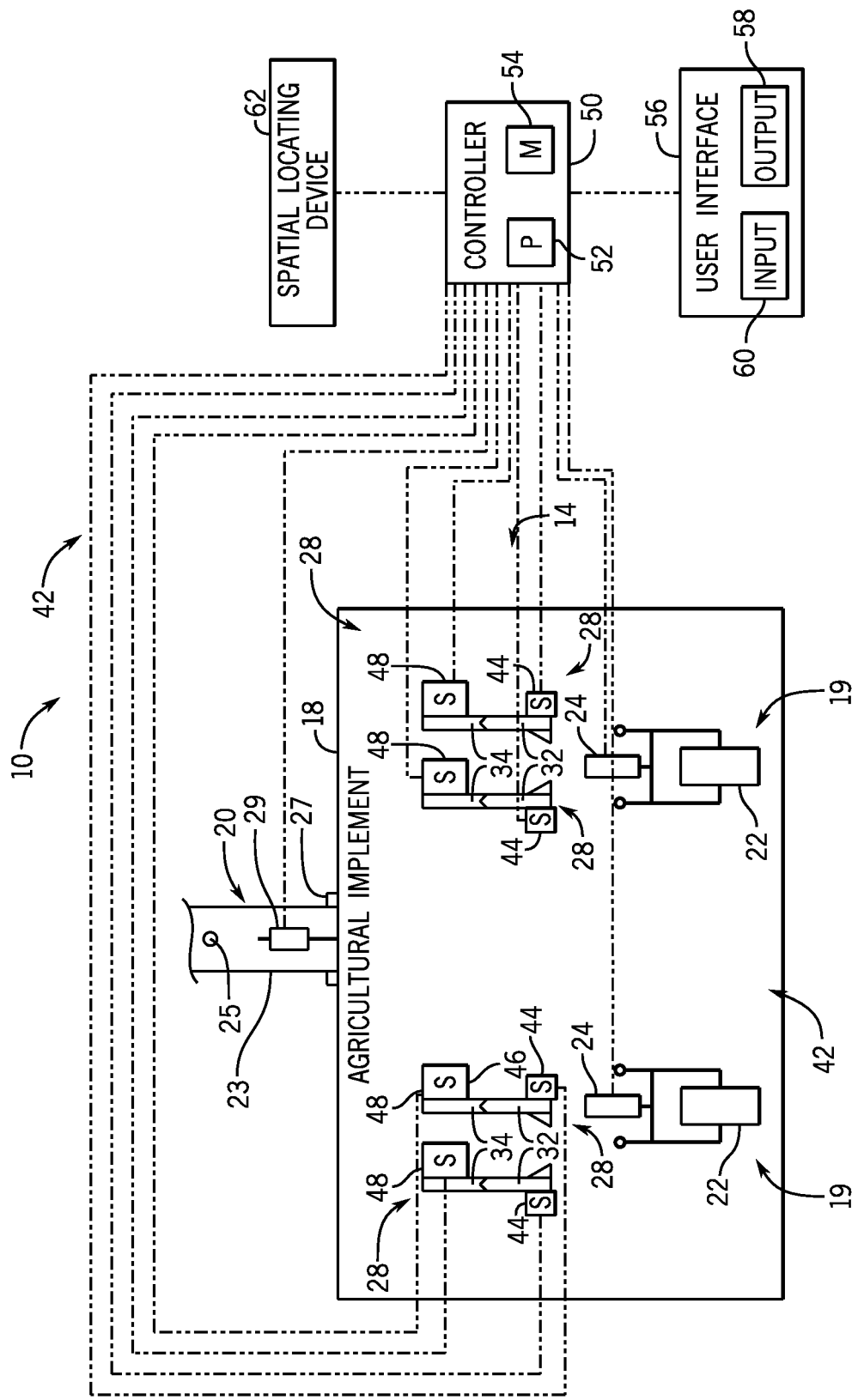
FIG. 2 is a block diagram of an embodiment of the implement monitoring/soil sensor control system that may be employed within the agricultural system of FIG. 1.

FIG. 2 is a block diagram of an embodiment of the implement monitoring/soil sensor control system 42, including the one or more soil sensors 44, which may be employed within the agricultural system 10 of FIG. 1. In the illustrated embodiment, the agricultural implement 14 includes the tillage point assemblies 28. However, in other embodiments, the agricultural implement 14 may include one or more disc blades, one or more finishing discs, other suitable ground engaging tool(s), or a combination thereof. The agricultural implement 14 also includes the implement monitoring/soil sensor control system 42 configured to monitor and/or determine the position of the main frame 18, the tillage point assembly/assemblies 28, other ground engaging tool(s), or a combination thereof. As discussed herein, the implement monitoring/soil sensor control system 42 may include the soil sensor(s) 44 that may be coupled to the ground engaging tool(s) (e.g., tillage point assembly/assemblies 28). In the illustrated embodiment, the implement monitoring/soil sensor control system 42 includes a controller 50 communicatively coupled to the wheel actuators 24, the hitch actuator 29, the main frame sensor(s) 48, and the soil sensor(s) 44.

In certain embodiments, the controller 50 is an electronic controller having electrical circuitry configured to process data from the main frame sensor(s) 48 and/or the soil sensor(s) 44 and to output instructions to the wheel actuators 24, to the hitch actuator 29, to the soil sensor(s) 44, to the work vehicle 12, or a combination thereof. In the illustrated embodiment, the controller 50 includes a processor, such as the illustrated microprocessor 52, and a memory device 54. The controller 50 may also include one or more storage devices and/or other suitable components. The processor 52 may be used to execute software, such as software for controlling the wheel actuators 24, the soil sensor(s) 44, and/or the hitch actuator 29, software for controlling the work vehicle 12, and so forth. Moreover, the processor 52 may include multiple microprocessors, one or more "general-purpose" microprocessors, one or more special-purpose microprocessors, one or more application specific integrated circuits (ASICS), and/or one or more field-programmable gate arrays (FPGA), or some combination thereof. For example, the processor 52 may include one or more reduced instruction set (RISC) processors.

The memory device 54 may include a volatile memory, such as random access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 52 to execute, such as instructions for controlling the wheel actuators 24, the soil sensor(s) 44, and/or the hitch actuator 29, instructions for controlling the work vehicle 12, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., one or more threshold values, etc.), instructions (e.g., software or firmware for controlling the actuator(s), etc.), and any other suitable data.

In certain embodiments, the controller 50 is configured to control an operational state (e.g., activate, deactivate) of the soil sensor(s) 44 based on penetration depth(s) of the ground engaging tool(s) into the soil 16, such as the tillage point assembly/assemblies 28. For example, the controller 50 of the implement monitoring/soil sensor control system 42 may be configured to determine a condition (e.g., above the surface of the soil, at the surface of the soil, or below the surface of the soil) of each soil sensor 44 and control the operational state of the soil sensor 44 based on the determined condition of the soil sensor 44. For example, the controller 50 may control the soil sensor 44 by outputting signal(s) wirelessly or by wired circuitry that selectively instruct the soil sensor 44 to activate (e.g., turn on, detect soil properties, output data associated with detected soil property/properties) or deactivate (e.g., turn off, abstain from detecting soil property/properties and/or abstain from sending data associated with detected soil property/properties). In certain embodiments, the controller 50 may receive signal(s) from the main frame sensor(s) 48 indicating a height of the main frame 18 above the surface 17 of the soil 16. Further, the controller may determine the tool penetration depth(s) of tillage point assembly/assemblies 28 coupled to the main frame 18 based on the height of the main frame 18 and known length(s) (e.g., height(s), vertical extent(s)) of the tillage point assembly/assemblies 28. The controller 50 may then determine the condition of the one or more soil sensors 44 coupled to the tillage point assembly/assemblies 28 based on the tool penetration depth(s) of the tillage point assembly/assemblies 28. Furthermore, the controller may control the operational state of each soil sensor based on the respective condition.

In some embodiments, the controller 50 may receive an indication of the tool penetration depth of the tillage point assembly 28, and the controller may control the operational state of the soil sensor(s) 44 based on the tool penetration depth. For example, in certain embodiments, the controller 50 may receive the indication of the tool penetration depth of the tillage point assembly 28. The controller 50 may control the operational state of (e.g., activate, deactivate) each soil sensor 44 coupled to the tillage point assembly 28 based on the tool penetration depth. Additionally or alternatively, the controller 50 may be configured to determine the condition (e.g., above the surface of the soil, at the surface 17 of the soil, or below the surface of the soil) of each soil sensor 44 based on the tool penetration depth of the tillage point assembly 28 and control the operational state of the soil sensor 44 based on the condition of the soil sensor 44 and/or the tool penetration depth of the tillage point assembly 28. Additionally or alternatively, in some embodiments, the operational state of each of the soil sensor(s) 44 may cause the controller 50 to selectively receive and/or regard (e.g., in the activated operational state) and/or disregarding (e.g., in the deactivated operational state) input and/or data from the soil sensor(s) 44 regarding detected one or more properties of the soil. For example, the controller 50 may selectively receive (e.g., process) or ignore (e.g., block, not receive, not process) data from each soil sensor 44 based on the operational state of the soil sensor 44, tool penetration depth, the condition of the soil sensor 44, or a combination thereof.

For example, as discussed herein, soil sensors 44 may be arranged along the vertical length, with respect to the vertical axis, of at least one tillage point assembly 28 such that each of the soil sensors 44 may correspond to a position value (e.g., height, 75 cm, 25 cm, 35 cm) along the vertical length of the tillage point assembly 28. For example, the soil sensors 44 may be arranged in a vertical array (e.g., vertical column, vertical configuration) along the shank 34 and/or tillage point 32 of the tillage point assembly 28, with respect to the vertical axis, such that during operation (e.g., the tillage point assemblies 28 are engaged with the soil 16), each of the position values of the soil sensors 44 may correspond to a soil depth. Moreover, the controller 50 may determine the condition of each soil sensor 44 based on the position value of the soil sensor 44 along the tillage point assembly 28 and a determined tool penetration depth of the tillage point assembly 28. In response to determining the condition of the soil sensor(s) 44, the controller 50 may control the operational state of each soil sensor 44. For example, in some embodiments, a first, a second, a third, and a fourth soil sensor may have position values of 15 cm, 25 cm, 50 cm, and 75 cm, respectively, along the vertical extent of the tillage point assembly 28. Furthermore, the controller 50 may receive an indication of the height of the main frame 18 above the surface of the soil from the main frame sensor(s) 48 and determine (e.g., calculate) that the tool penetration depth of the tillage point assembly 28 is 50 cm. The controller may then determine the vertical position of each soil sensor 44 relative to the soil surface based on the position value and the penetration depth of the tillage point assembly 28. In this example, the controller may compare the position values of 15 cm, 25 cm, 50 cm, and 75 cm of each of the first, the second, the third, and the fourth soil sensor to the tool penetration depth of 50 cm to determine whether the respective position values of each soil sensor is greater than, equal to, or less than the tool penetration depth. For instance, the controller may determine that the position value of the first sensor 44a, 15 cm, is less than the tool penetration depth, 50 cm, and/or may subtract the tool penetration depth, 50 cm, from the position value of the first soil sensor, 15 cm, to calculate the vertical position of the first soil sensor relative to the soil surface as equal to −35 cm. In this instance, a negative vertical position may indicate that the soil sensor 44 is below the surface of the soil, whereas a positive vertical position may indicate that the soil sensor 44 is above the surface of the soil and a vertical position of zero may indicate that the soil sensor 44 is at and/or equal to the surface of the soil. In some embodiments, the controller may utilize a lookup table to determine the vertical position of the soil sensor(s). Continuing with the above example, the controller may determine the conditions of the first, second, and third soil sensor are at or below the surface of the soil, and the condition of the fourth soil sensor is above the surface of the soil based on the vertical position(s) of the soil sensor(s). In response to determining the condition of the first, second, third, and fourth soil sensors, the controller may activate the first, second, and third soil sensor, and abstain from activating/deactivate the fourth soil sensor In some embodiments, a portion of the soil sensors 44 coupled to a tillage point assembly 28 may be activated and/or deactivated based on the tool penetration depth, the height of the main frame 18, the determined condition of the respective soil sensor 44, or a combination thereof, while in certain embodiments, a whole array of the soil sensors 44 of a tillage point assembly 28 may be activated and/or deactivated based on the tool penetration depth, the height of the main frame 18, the determined condition(s) of one or more of the soil sensors 44 of the array, or a combination thereof. Furthermore, in some embodiments, the controller may include control logic and in response to determining the tool penetration depth, may control the operational state of each soil sensor 44. In particular, the controller may determine the detected tool penetration depth and activate the soil sensor(s) 44 that correspond to one or more threshold value(s). For example, one or more of the soil sensor(s) 44 may be associated with one or more of the threshold value(s) and the controller may determine that when the detected tool penetration depth is greater than or equal to a threshold value of the one or more threshold value(s), the controller may activate the soil sensor(s) that are associated with the threshold value. While when the detected tool penetration depth is less than the threshold value, the controller may abstain from activating the soil sensor(s) 44 that correspond to the threshold value.

In some embodiments the controller 50 may utilize a lookup table to determine the operational state of the soil sensor(s) 44. In particular, the lookup table may include one or more threshold value(s) and/or one or more threshold range(s) (e.g., 25 cm, 75 cm, 0-20 cm, 0-30 cm, 0-40 cm, and so forth) and the soil sensor(s) 44 that may be associated with the threshold value(s) and/or threshold range(s). For example, the controller may determine the tool penetration depth of the ground engaging tool(s) and compare the tool penetration depth to the threshold value(s) and/or threshold range(s) stored in the lookup table. In response to the tool penetration depth being greater than or equal to the threshold value(s) and/or threshold range(s), the controller may activate the soil sensor(s) 44 that are associated with (e.g., indicated by the lookup table) the threshold value(s) and/or threshold range(s). On the other hand, in response to the tool penetration depth being less than the threshold value(s) and/or threshold range(s), the controller may abstain from activating the soil sensor(s) 44 that are associated with the threshold value(s) and/or threshold range(s). In some embodiments, the lookup table may comprise one or more tool penetration depth(s) and/or tool penetration depth range(s) and the associated soil sensor(s). The controller may utilize the lookup table to determine activation of the soil sensor(s) based on the tool penetration depth(s) and/or tool penetration depth range(s). For example, the controller may determine and/or detect the tool penetration depth of the ground engaging tool and utilize the lookup table to activate the one or more soil sensor(s) coupled to the ground engaging tool that are associated with the tool penetration depth and/or associated with a tool penetration depth range corresponding to the determined and/or detected tool penetration depth (e.g., the determined and/or detected tool penetration depth may be a maximum tool penetration depth value of the corresponding tool penetration depth range).

In the illustrated embodiment, the implement monitoring/soil sensor control system 42 includes a user interface 56 communicatively coupled to the controller 50. The user interface 56 is configured to receive input from an operator (e.g., a human operator) and to provide information to the operator. The user interface 56 may include any suitable input device(s) 60 for receiving input, such as a keyboard, a mouse, touch screen(s), button(s), switch(es), knob(s), other suitable input device(s) 60, or any combination thereof. In addition, the user interface 56 may include any suitable output device(s) 58 for presenting information to the operator, such as speaker(s), indicator light(s), display(s), other suitable output device(s), or any combination thereof. For example, the user interface 56 may enable the operator to provide inputs to set a target tool penetration depth, to set the threshold value(s) and/or threshold range(s), to input the position values of the soil sensor(s) 44, to override the automatically controlled operational state(s) of the soil sensor(s) 44, and/or to control the wheel actuator(s) 24. Additionally or alternatively, the user interface 56 may present (e.g., via a display, indication, notification) the tool penetration depth(s), the operational state(s) of the soil sensor(s) 44, the condition(s) of the soil sensor(s) 44, an indication of whether the current tool penetration depth meets a target tool penetration depth, the set threshold value(s) and/or threshold range(s), the position values and/or the vertical positions of the soil sensors 44, an indication of current detected soil properties (e.g., as detected by the soil sensor(s) 44), current control instruction(s) being sent to the wheel actuator(s) 24 (e.g., to extend to increase the height of the main frame 18, to retract to decrease the height of the main frame 18), current control instruction(s) being sent to the soil sensor(s) 44, or any combination thereof. Furthermore, in some embodiments, the display may present an indication (e.g., flag, notification) of areas of soil that may have detected soil property/properties that are outside of the desired soil property/properties. For example, the display may indicate that soil located in a certain area and/or depth of the field is too dry (e.g., detected soil moisture is below a desired soil moisture) and/or too cold (e.g., detected soil temperature is below a desired soil temperature). Moreover, in some embodiments, after receiving data indicating the one or more properties of the soil, the display may present (e.g., the controller 50 may determine and cause the display to present) an indication of suggested seed depths and/or planting times (e.g., one day after data collected, two days after) based on the received data. For example, the received data may indicate a current soil temperature that is below a desired soil temperature for planting. The controller 50 may determine an amount of time that may need to pass for the detected soil temperature to reach the desired soil temperature, and may cause the display to present an indication of the amount of time.

In the illustrated embodiment, the controller 50 is communicatively coupled to the soil sensor(s) 44. The soil sensor(s) 44 may output signal(s) wirelessly to the controller 50; however, wired circuitry may be included. In addition, the soil sensor(s) 44 may communicate with the controller 50 using any suitable communication protocol, such as a standard communication protocol (e.g., controller area network CAN bus, ISOBUS, etc.) or a proprietary protocol. Further, the soil sensor(s) 44 may output signal(s) (e.g., data) to the controller 50, and the signal(s) may be indicative of various detected condition(s) or property/properties of the soil (e.g., temperature, percentage organic soil, soil pH, soil moisture, soil composition). For example, the soil sensor(s) 44 may include optical sensor(s), reflectivity sensor(s), temperature sensor(s), thermocouple sensor(s), electrical conductivity sensor(s), or a combination thereof. The soil sensor(s) 44 may be configured to detect property/properties of the soil, such as organic material percentage in the soil, mean particle size, particle size distribution, soil temperature, soil pH, nitrogen concentration, soil moisture content, soil composition, or any combination thereof. Furthermore, in some embodiments, the signal(s) and/or data may include raw data and the controller 50 may receive the raw data and process the raw data to determine the detected soil property/properties. Additionally or alternatively, the controller 50 may process the raw data and determine one or more soil property ratings of the soil. For example, the soil sensor(s) 44 may include thermocouple sensor(s) configured to output signal(s) (e.g., data) to the controller 50 indicative of detected temperature(s) of the soil. For example, the signal(s) and/or data may include raw temperature data and the controller 50 may receive the raw temperature data and process the raw temperature data to determine detected temperature(s) of the soil. Additionally or alternatively, the controller 50 may process the raw temperature data and determine soil temperature rating(s) of the soil. For example, the raw temperature data may be analyzed (e.g., processed) by the controller 50 and, additionally, the controller 50 may use the raw temperature data to determine the soil temperature rating(s) (e.g., as either the soil is at a desired soil temperature for planting, not at a desired soil temperature for planting, or within a threshold amount of the desired soil temperature for planting). The temperature rating(s) may be displayed and/or indicated via the user interface 56 and, in some embodiments, displayed as numeric rating(s), color-coded rating(s), and/or letter rating(s). In some embodiments, the soil sensor(s) 44 may send processed data (e.g., via CAN message(s), signal(s)) indicating the detected property/properties of the soil, and the controller 50 may receive the processed data and additionally store (e.g., in the memory 54) and/or display (e.g., via the user interface 56) the processed data indicating the detected soil property/properties. In some embodiments, the controller 50 may combine and/or associate (e.g., further process) data received from one or more respective soil sensors to provide for a more complete analysis of the soil property/properties of the field.

In some embodiments, the data indicating the detected property/properties of the soil received and/or processed by the controller 50 may be associated with received positional data of the agricultural implement within a field to generate a three-dimensional (3D) map of the field and/or portion of the field tilled by the agricultural implement. The 3D map may indicate detected soil property/properties at varying soil depths per location (e.g., geographical position) of the detected property/properties within the field and/or portion of the field. In the illustrated embodiment, the implement monitoring/soil sensor control system 42 includes a spatial locating device 62 communicatively coupled to the controller 50. The spatial locating device may be coupled to the agricultural implement 14 or, in some embodiments, to the work vehicle 12. Further, the spatial locating device 62 is configured to output a signal (e.g., positional data) indicative of a position (e.g. location) of the agricultural implement 14 and/or the work vehicle 12. The spatial locating device 62 may include any suitable system configured to measure and/or facilitate determination of the position of the agricultural implement 14 and/or the work vehicle 12, such as a global positioning system (GPS) receiver, for example. The spatial locating device 62 may output the signal (e.g., positional data) indicative of the position (e.g., location) of the agricultural implement 14 and/or the work vehicle 12 to the implement monitoring/soil sensor control system controller 50. Furthermore, the controller 50 may receive the positional data and associate the positional data with data indicating the detected property/properties of the soil received from one or more of the soil sensor(s) 44 at relatively the same time as the positional data. For example, the controller 50 may receive the positional data indicating a location of the agricultural implement 14 and further determine a location of each tillage point assembly 28 coupled to the agricultural implement 14 based on the location of the agricultural implement 14 and a known coupling (e.g., connection) position of the tillage point assembly 28 on the agricultural implement 14. Further, the controller may associate the location of the tillage point assembly 28 with temperature data received from a thermocouple sensor (e.g., soil sensor 44) on a tillage point assembly 28 of the agricultural implement 14. Additionally, as discussed herein, the tool penetration depth and the position value of the thermocouple sensor (e.g., soil sensor 44) along the tillage point assembly 28 may be known, and thus a depth of the thermocouple sensor (e.g., soil sensor 44) below the surface of the soil (e.g., associated with the vertical position) may be determined and further associated with the location of the tillage point assembly 28 and the temperature data. In this way, the associated (e.g., combined) data may indicate a detected soil temperature, at a particular soil depth, at a particular location within the field in which the agricultural implement 14 is operating. The controller 50 may continue to associate additional data received from multiple soil sensors 44 coupled to the agricultural implement 14 with respective soil depths with determined locations of the tillage point assemblies 28 of the agricultural implement 14 as the agricultural implement 14 moves and operates within the field. Thus, once the field or at least a portion of the field has been tilled, the controller 50 may generate a 3D map indicating the detected soil temperatures at varying soil depths at multiple locations within the field or at least portion of the field. The 3D map may be displayed via a display of the user interface 56. In some embodiments, the 3D map may include the one or more soil property ratings and/or the 3D map may be color-coded to indicate the one or more soil property ratings and/or the one or more detected soil properties at the particular soil depths and locations within the field. For example, the display of the user interface 56 may present a visual representation of the 3D map and an indication of the one or more soil property ratings and/or the one or more detected soil properties at the particular soil depths and the particular locations within the 3D map that the one or more soil properties were detected. By way of example, the detected soil property of the 3D map may be soil temperature, and the soil property ratings may be (1) at desired soil temperature, (2) above desired soil temperature, (3) below desired soil temperature. Further, the display may present portions of the 3D map (e.g., particular locations at particular soil depths) in a first color if the soil property rating is (1) at desired soil temperature, and present other portions of the 3D map in a second color if the soil property rating is (2) above desired soil temperature. In other embodiments, the 3D map may additionally and/or alternatively comprise an indication of other soil properties such as organic material percentage in the soil, mean particle size, particle size distribution, soil temperature, soil pH, nitrogen concentration, soil moisture content, soil composition, or any combination thereof.

The data gathered, associated, combined and/or displayed indicating the one or more soil properties at particular soil depths and locations within a field is useful in subsequent planting and/or seeding operations. For example, certain soil properties are desired during planting and/or seeding operations so as to provide for a more even emergence of the plants and/or crops of the field (e.g., each plant emerges from the soil at relatively the same time), thereby establishing a higher crop yield, as compared to fields seeded and/or planted without use of the data associated with the detected soil properties. Therefore, accurate data associated with soil conditions at varying depths and locations within a field may facilitate determining a timing of the planting and/or seeding operations and/or a seed depth during planting and/or seeding operations. Furthermore, in some embodiments, the implement monitoring/soil sensor control system 42 as discussed herein, may operate with an agricultural planting implement and, thus, adjust a seed planting depth in real time. For example, the implement monitoring/soil sensor control system may operate ahead of a seed planter tool on the agricultural planting implement, and the controller may adjust the seed planting depth based on detected soil properties received from one or more of the soil sensor(s).

While the implement monitoring and soil sensor control process described above is controlled by the implement monitoring/soil sensor control system controller 50 in the illustrated embodiment, in other embodiments, the implement monitoring and soil sensor control process may be controlled by a controller of the work vehicle 12 or a combination of the implement monitoring/soil sensor control system controller 50 and the controller of the work vehicle 12. Furthermore, in certain embodiments, the agricultural implement may be self-propelled. In such embodiments, elements and systems that may be communicatively coupled to the controller of the work vehicle (e.g., a steering control system, a speed control system) may be communicatively coupled to the implement monitoring/soil sensor control system controller 50. In such embodiments, the implement monitoring/soil sensor control system controller 50 may control a speed of the agricultural implement via the speed control system. In addition, in certain embodiments, the user interface 56 may be positioned remote from the work vehicle 12 and/or the agricultural implement 14 (e.g., in embodiments in which the agricultural system is controlled by a remote operator). Furthermore, as discussed herein, in some embodiments, the implement monitoring/ soil sensor control system 42 may include soil sensor(s) 44 coupled to one or more non-tool elements of the agricultural implement 14. For example, the soil sensor(s) may be coupled to one or more independent ground engaging elements coupled to the agricultural implement frame 18.

Figure 3:
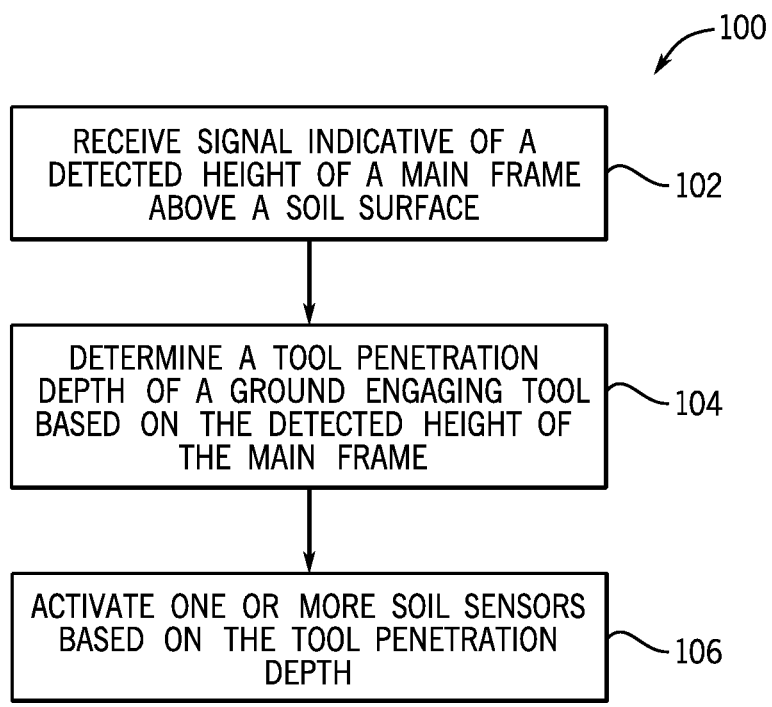
FIG. 3 is a flow diagram of an embodiment of a method for activating one or more soil sensors of an implement monitoring/soil sensor control system.

With the foregoing in mind, FIG. 3 is a flow diagram of an embodiment of a method 100 for activating one or more soil sensors of the implement monitoring/soil sensor control system based on a determined tool penetration depth. The following description of the method 100 is described as being performed by a processing system (e.g., the controller 50), but it should be noted that any suitable processor-based device or system may be specially programmed to perform any of the methods described herein. Moreover, although the following description of the method 100 is described as including certain blocks performed in a particular order, the blocks of the method 100 may be performed in any suitable order, that certain blocks may be omitted, that certain blocks may be added or modified, or a combination thereof.

As represented by block 102, a signal indicative of a detected height of the main frame may be received (e.g., by the controller). The signal indicative of the detected height of the main frame may be received via output from the main frame sensor(s). In another embodiment, the signal indicative of the height of the main frame may be received via input from the user interface (e.g., by the operator). In some embodiments, the signal may comprise a commanded height of the main frame. For example, the controller may receive a signal from a controller, the same or different from the controller, that may be configured to control the height of the main frame and the signal may be indicative of a commanded height of the main frame.

The tool penetration depth of a ground engaging tool may be determined (e.g., by the controller), at block 104, based on the height of the main frame. As discussed herein, the tool penetration depth may correspond to a portion of a vertical length (e.g., vertical extent, height), with respect to the vertical axis, of the ground engaging tool that is beneath the surface of the soil (e.g., submerged below the surface of the soil, extended into the soil). In addition, the ground engaging tool may be coupled to the main frame, thus a height of the main frame may be used to determine a tool penetration depth of the ground engaging tool. For example, a total vertical length (e.g., height) of the coupled ground engaging tool (e.g., from the main frame to an end/tip of the ground engaging tool) may be stored, such as in the memory of the controller, and retrieved and/or received via input from the user interface (e.g., by the operator). The detected height of the main frame may then be subtracted from the total vertical length of the coupled ground engaging tool to determine the penetration depth of the coupled ground engaging tool.

At block 106, the controller may activate one or more soil sensor(s) coupled to the ground engaging tool based on the determined tool penetration depth of the ground engaging tool. As discussed herein, the controller may control the operational state (e.g., activate, deactivate) of each soil sensor 44 coupled to the ground engaging tool(s) based on the tool penetration depth(s). Additionally or alternatively, the controller may be configured to determine the condition (e.g., above the surface of the soil, at the surface of the soil, or below the surface of the soil) of each sensor based on the tool penetration depth of the ground engaging tool and control the operational state of the soil sensor based on the condition of the soil sensor. Additionally or alternatively, in some embodiments, the operational state of each of the soil sensor(s) may cause the controller to selectively receive and/or regard (e.g., in the activated operational state) and/or disregarding (e.g., in the deactivated operational state) input and/or data from the soil sensor(s) regarding detected one or more properties of the soil. For example, the controller may selectively receive (e.g., process) or ignore (e.g., block, not receive, not process) data from each soil sensor based on the operational state of the soil sensor, tool penetration depth, the condition of the soil sensor, or a combination thereof.

For example, as discussed herein, the soil sensors may be arranged along the vertical length, with respect to the vertical axis, of the ground engaging tool such that each of the soil sensors may correspond to a position value (e.g., height, 75 cm, 25 cm, 35 cm) along the ground engaging tool. For example, the soil sensors may be arranged in a vertical array (e.g., vertical column, vertical configuration) along the ground engaging tool (e.g., tillage point assembly, shank, tillage point), with respect to the vertical axis, such that during operation (e.g., the ground engaging tools are engaged with the soil), each of the position values of the soil sensors may correspond to a soil depth. Moreover, the controller may determine the respective soil depth of the soil sensors based on the determined tool penetration depth. Furthermore, the controller may determine the condition of each soil sensor based on the position value of the soil sensor along the ground engaging tool and the tool penetration depth of the ground engaging tool. In response to determining the condition of the soil sensor(s), the controller may control the operational state of each soil sensor. For example, in some embodiments, a first, a second, a third, and a fourth soil sensor may have position values of 15 cm, 25 cm, 50 cm, and 75 cm, respectively, along the vertical extent of the ground engaging tool. Furthermore, the controller may receive an indication of the height of the main frame above the surface of the soil and determine (e.g., calculate) that the tool penetration depth of the ground engaging tool is 50 cm. The controller may then determine the vertical position of each soil sensor relative to the soil surface based on the position value and the penetration depth of the ground engaging tool. In this example, the controller may compare the position values of 15 cm, 25 cm, 50 cm, and 75 cm of each of the first, the second, the third, and the fourth soil sensor to the tool penetration depth of 50 cm to determine whether the respective position values of each soil sensor is greater than, equal to, or less than the tool penetration depth. For instance, the controller may determine that the position value of the first sensor, 15 cm, is less than the tool penetration depth, 50 cm, and/or may subtract the tool penetration depth, 50 cm, from the position value of the first soil sensor, 15 cm, to calculate the vertical position of the first soil sensor relative to the soil surface as equal to −35 cm. In this instance, a negative vertical position may indicate that the soil sensor is below the surface of the soil, whereas a positive vertical position may indicate that the soil sensor 44 is above the surface of the soil and a vertical position of zero may indicate that the soil sensor 44 is at and/or equal to the surface of the soil. In some embodiments, the controller may utilize a lookup table to determine the vertical position of the soil sensor(s). Continuing with the above example, the controller may determine the conditions of the first, second, and third soil sensor are at or below the surface of the soil 16 and the condition of the fourth soil sensor is above the surface of the soil based on the vertical position(s) of the soil sensor(s). In response to determining the condition of the first, second, third, and fourth soil sensors, the controller may activate the first, second, and third soil sensor, and abstain from activating/deactivate the fourth soil sensor. In some embodiments, the controller may include control logic and in response to determining the tool penetration depth, may control the operational state of each soil sensor. In particular, the controller may determine the detected tool penetration depth and activate the soil sensor(s) that correspond to one or more threshold value(s). For example, one or more of the soil sensor(s) may be associated with one or more of the threshold value(s) and the controller may determine that when the detected tool penetration depth is greater than or equal to a threshold value of the one or more threshold value(s), the controller may activate the soil sensor(s) that are associated with the threshold value. While when the detected tool penetration depth is less than the threshold value, the controller may abstain from activating the soil sensor(s) that correspond to the threshold value.

In some embodiments, as discussed herein, the controller may utilize a lookup table to determine the operational state of the soil sensor(s). In particular, the lookup table may include one or more threshold value(s) and/or one or more threshold range(s) (e.g., 25 cm, 75 cm, 0-20 cm, 0-30 cm, 0-40 cm, and so forth) and the soil sensor(s) that may be associated with the threshold value(s) and/or threshold range(s). For example, the controller may determine the tool penetration depth of the ground engaging tool(s) and compare the tool penetration depth to the threshold value(s) and/or threshold range(s) stored in the lookup table. In response to the tool penetration depth being greater than or equal to the threshold value(s) and/or threshold range(s), the controller may activate the soil sensor(s) that are associated with (e.g., indicated by the lookup table) the threshold value(s) and/or threshold range(s). On the other hand, in response to the tool penetration depth being less than the threshold value(s) and/or threshold range(s), the controller may abstain from activating the soil sensor(s) that are associated with the threshold value(s) and/or threshold range(s). In some embodiments, the lookup table may comprise one or more tool penetration depth(s) and/or tool penetration depth range(s) and the associated soil sensor(s). The controller may utilize the lookup table to determine activation of the soil sensor(s) based on the tool penetration depth(s) and/or tool penetration depth range(s). For example, the controller may determine and/or detect the tool penetration depth of the ground engaging tool and utilize the lookup table to activate the one or more soil sensor(s) coupled to the ground engaging tool that are associated with the tool penetration depth and/or associated with a tool penetration depth range corresponding to the determined and/or detected tool penetration depth (e.g., the determined and/or detected tool penetration depth may be a maximum tool penetration depth value of the corresponding tool penetration depth range).

Figure 4:
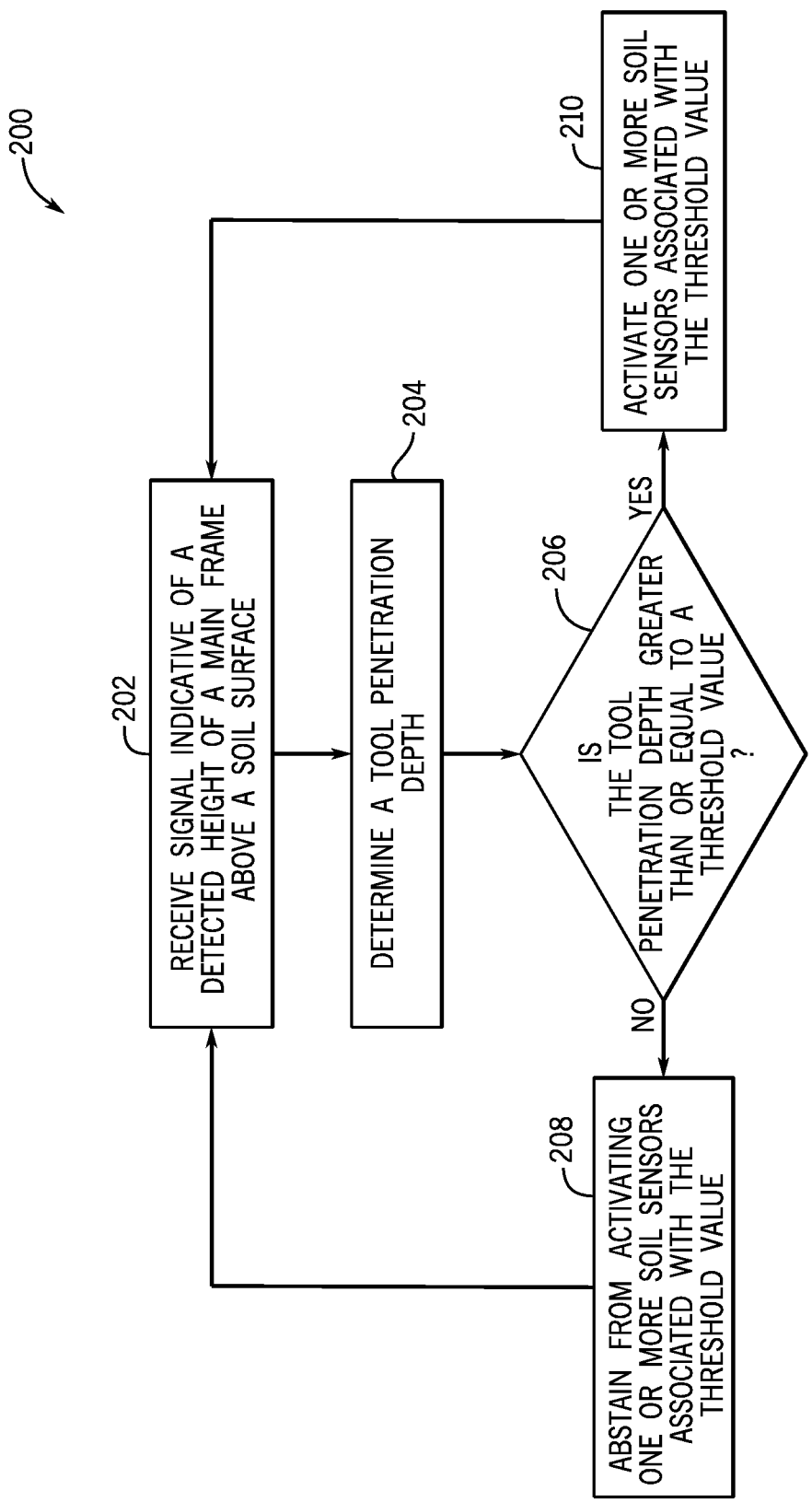
FIG. 4 is a flow diagram of an embodiment of a method for activating one or more soil sensors of an implement monitoring/soil sensor control system and utilizing a threshold value.

Moreover, FIG. 4 is a flow diagram of an embodiment of a method 200 for activating the soil sensor(s) of the implement monitoring/soil sensor control system based on a determined tool penetration depth and utilizing a threshold value (e.g., threshold range). The following description of the method 200 is described as being performed by a processing system (e.g., the controller 50), but it should be noted that any suitable processor-based device or system may be specially programmed to perform any of the methods described herein. Moreover, although the following description of the method 200 is described as including certain blocks performed in a particular order, the blocks of the method 200 may be performed in any suitable order, that certain blocks may be omitted, added, modified, or a combination thereof.

As represented by block 202, a signal indicative of a detected height of the main frame may be received (e.g., by the controller). The signal indicative of the detected height of the main frame may be received via output from the main frame sensor(s). In another embodiment, the signal indicative of the height of the main frame may be received via input from the user interface (e.g., by the operator). In some embodiments, the signal may comprise a commanded height of the main frame. For example, the controller may receive a signal from a controller, the same or different from the controller, that may be configured to control the height of the main frame and the signal may be indicative of a commanded height of the main frame.

The tool penetration depth of a ground engaging tool may be determined (e.g., by the controller), at block 204, based on the height of the main frame. As discussed herein, the tool penetration depth may correspond to a portion of a vertical length (e.g., a height, an amount, 10 cm, 25 cm, 75 cm), with respect to the vertical axis, of the ground engaging tool(s) that is beneath the surface of the soil (e.g., submerged below the surface of the soil, extended into the soil). In addition, the ground engaging tool may be coupled to the main frame, thus a height of the main frame may correspond to a tool penetration depth of the ground engaging tool. In particular, a total vertical length (e.g., height) of the coupled ground engaging tool (e.g., from the main frame to an end/tip of the ground engaging tool) may be stored, such as in the memory of the controller, and retrieved and/or received via input from the user interface (e.g., by the operator). The detected height of the main frame may then be subtracted from the total vertical length of the coupled ground engaging tool to determine the tool penetration depth of the coupled ground engaging tool.

At block 206, the controller may determine if the detected tool penetration depth is greater than or equal to a threshold value (e.g., threshold range). In particular, the controller may store, such as in the memory, one or more threshold value(s) and/or one or more threshold range(s). In some embodiments, the threshold value(s) and/or threshold range(s) may be received by the controller via input from the user interface (e.g., by the operator). In another embodiment, the threshold value(s) and/or threshold range(s) may be established in some other way, such as by being pre-programmed into the controller by a manufacturer.

Furthermore, if the controller determines that the detected tool penetration depth is not greater than or equal to the threshold value, at block 208, the controller may abstain from activating one or more of the soil sensors(s) associated with the threshold value. On the other hand, if the controller determines that the detected tool penetration depth is greater than or equal to the threshold value, at block 210, the controller may activate one or more of the soil sensor(s) associated with the threshold value. As discussed herein, the controller may activate the one or more soil sensor(s) by outputting one or more control signals to the soil sensor(s) associated with the threshold value. During operation of the agricultural system, the method 200 may operate as a loop and return to blocks 202-210 to cyclically control the operational state (e.g., activated, deactivated) of the one or more soil sensors based on the detected height of the main frame (e.g., the condition of the one or more soil sensors) as the agricultural system moves through a field. In certain embodiments, the step of determining the main frame height may be omitted, for example, the tool penetration depth of the one or more ground engaging tool(s) may be determined directly based on feedback from one or more sensor(s) coupled at each of the one or more ground engaging tool(s). In any case, the implement monitoring/soil sensor control system may actively monitor the height of the main frame and/or the tool penetration depth of the ground engaging tool(s) to selectively control the operational state of the soil sensor(s) and thus enable gathering of more accurate data indicating the properties of the soil from the soil sensor(s). Additionally, as discussed herein, the implement monitoring/soil sensor control system may enable gathering of data that more accurately reflects the actual soil conditions and the data may be utilized to improve subsequent planting and/or seeding operations.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A soil sensor control system for an agricultural implement, comprising:
a controller comprising a memory and a processor, wherein the controller is configured to:
determine a tool penetration depth of a ground engaging tool configured to couple to a main frame of the agricultural implement;
determine that the tool penetration depth is greater than, less than, or equal to a first position value associated with a first soil sensor coupled to the ground engaging tool;
in response to determining that the tool penetration depth is greater than the first position value, determine that a condition of the first soil sensor is below a soil surface;
in response to determining that the tool penetration depth is less than the first position value, determine that the condition of the first soil sensor is above the soil surface;
in response to determining that the tool penetration depth is equal to the first position value, determine that the condition of the first soil sensor is at the soil surface; and
control an operational state of the first soil sensor based on the condition of the first soil sensor.

2. The soil sensor control system of claim 1, comprising a main frame sensor configured to couple to the main frame and to output a frame height signal indicative of a height of the main frame of the agricultural implement above the soil surface, wherein the controller is configured to receive the frame height signal and to determine the tool penetration depth based on the height of the main frame above the soil surface.

3. The soil sensor control system of claim 1, wherein the first soil sensor is configured to couple to a shank of the ground engaging tool at a position along the shank corresponding to the first position value, and wherein the controller is configured to
activate the first soil sensor in response to determining the condition of the first soil sensor is at or below the soil surface.

4. The soil sensor control system of claim 3, wherein the controller is configured to abstain from activating the first soil sensor in response to determining the condition of the first soil sensor is above the soil surface.

5. The soil sensor control system of claim 1, comprising a plurality of soil sensors coupled to the ground engaging tool, wherein the plurality of soil sensors comprises the first soil sensor, and wherein the plurality of soil sensors is coupled to the ground engaging tool in a vertical array.

6. The soil sensor control system of claim 5, wherein the plurality of soil sensors comprises a second soil sensor associated with a second position value, and wherein the controller is configured to:
determine that the tool penetration depth is greater than, less than, or equal to the second position value associated with the second soil sensor;
in response to determining that the tool penetration depth is greater than the second position value, determine that an additional condition of the second soil sensor is below the soil surface;
in response to determining that the tool penetration depth is less than the second position value, determine that the additional condition of the second soil sensor is above the soil surface;
in response to determining that the tool penetration depth is equal to the second position value, determine that the additional condition of the second soil sensor is at the soil surface; and
control an additional operational state of the second soil sensor based on the additional condition of the second soil sensor.

7. The soil sensor control system of claim 1, wherein the first soil sensor is configured to detect one or more soil properties and is configured to output one or more sensor signals indicative of the one or more soil properties.

8. The soil sensor control system of claim 7, wherein the one or more soil properties comprise soil temperature, organic material percentage, mean particle size, particle size distribution, soil pH, soil nitrogen concentration, soil composition, soil moisture content, or any combination thereof.

9. The soil sensor control system of claim 7, wherein the controller is configured to:
receive the one or more sensor signals;
receive a position signal indicative of a geographical position of the agricultural implement; and
generate a map based on the tool penetration depth of the ground engaging tool, the one or more soil properties, and the geographical position.

10. The soil sensor control system of claim 1, wherein the first soil sensor comprises an optical sensor, a temperature sensor, a reflectivity sensor, or an electrical conductivity sensor.

11. A soil sensor control system for an agricultural implement, comprising:
one or more soil sensors configured to couple to a ground engaging tool of the agricultural implement, wherein the one or more soil sensors are configured to detect one or more soil properties; and
a controller comprising a memory and a processor, wherein the controller is configured to:
determine a tool penetration depth of the ground engaging tool configured to couple to a main frame of the agricultural implement;
determine that the tool penetration depth is greater than, less than, or equal to a first position value associated with a first soil sensor of the one or more soil sensors;
in response to determining that the tool penetration depth is greater than the first position value, determine that a condition of the first soil sensor is below a soil surface;
in response to determining that the tool penetration depth is less than the first position value, determine that the condition of the first soil sensor is above the soil surface;

in response to determining that the tool penetration depth is equal to the first position value, determine that the condition of the first soil sensor is at the soil surface; and control an operational state of the first soil sensor based on the condition of the first soil sensor.

12. The soil sensor control system of claim 11, comprising a main frame sensor configured to couple to the main frame and output a frame height signal indicative of a height of the main frame of the agricultural implement above the soil surface, wherein the controller is configured to receive the frame height signal to determine the tool penetration depth based on the height of the main frame above the soil surface.

13. The soil sensor control system of claim 12, wherein the one or more soil sensors are configured to couple to the ground engaging tool in a vertical array along a shank of the ground engaging tool, and wherein each of the one or more soil sensors are associated with a position value along the shank.

14. The soil sensor control system of claim 13, wherein the one or more soil sensors are configured to output one or more signals indicative of the one or more soil properties, and wherein the controller is configured to:
receive the one or more signals;
receive a position signal indicative of a geographical position of the agricultural implement; and
generate a map based on the tool penetration depth of the ground engaging tool, the one or more soil properties, and the geographical position.

15. The soil sensor control system of claim 11, wherein the controller is configured to:
activate the first soil sensor of the one or more soil sensors in response to determining the condition of the first soil sensor is at or below the soil surface; and
abstain from activating the first soil sensor in response to determining the condition of the first soil sensor is above the soil surface.

16. The soil sensor control system of claim 11, wherein the one or more soil sensors comprises an optical sensor, a temperature sensor, a reflectivity sensor, an electrical conductivity sensor, or any combination thereof.

17. The soil sensor control system of claim 11, wherein the one or more soil sensors comprises a second soil sensor associated with a second position value along the ground engaging tool, and wherein the controller is configured to:
determine that the tool penetration depth is greater than, less than, or equal to the second position value associated with the second soil sensor;
in response to determining that the tool penetration depth is greater than the second position value, determine that an additional condition of the second soil sensor is below the soil surface;
in response to determining that the tool penetration depth is less than the second position value, determine that the additional condition of the second soil sensor is above the soil surface;
in response to determining that the tool penetration depth is equal to the second position value, determine that the additional condition of the second soil sensor is at the soil surface; and control an additional operational state of the second soil sensor based on the condition of the second soil sensor.

18. A method of soil sensor activation, the method comprising:
determining, via a controller comprising a processor and a memory, a tool penetration depth of a ground engaging tool configured to couple to a main frame of an agricultural implement;
determining, via the controller, that the tool penetration depth is greater than, less than, or equal to a first position value associated with a first soil sensor of one or more soil sensors coupled to the ground engaging tool;
in response to determining that the tool penetration depth is greater than the first position value, determining, via the controller, that a condition of the first soil sensor of the one or more soil sensors is below a soil surface;
in response to determining that the tool penetration depth is less than the first position value, determining, via the controller, that the condition of the first soil sensor of the one or more soil sensors is above the soil surface;
in response to determining that the tool penetration depth is equal to the first position value, determining, via the controller, that the condition of the first soil sensor is at the soil surface; and
controlling, via the controller, an operational state of the first soil sensor of the one or more soil sensors based on the condition of the first soil sensor, wherein the one or more soil sensors are configured to detect one or more soil properties.

19. The method of claim 18, comprising receiving, via the controller comprising, a frame height signal indicative of a height of a main frame of the agricultural implement above the soil surface from a main frame sensor configured to couple to the main frame, wherein the controller is configured to determine the tool penetration depth based on the height of the main frame above the soil surface.

20. The method of claim 19, wherein the first soil sensor is configured to couple to a shank of the ground engaging tool at a position along the shank corresponding to the first position value, and wherein the method comprises:
in response to determining that the condition of the first soil sensor is at or below the soil surface activating, via the controller, the first soil sensor; and
in response to determining that the condition of the first soil sensor is above the soil surface abstain from activating, via the controller, the first soil sensor.

* * * * *